United States Patent [19]

Hartwich

[11] 4,120,372
[45] Oct. 17, 1978

[54] JOINTS

[75] Inventor: Siegfried Hartwich, Letter, Fed. Rep. of Germany

[73] Assignee: Massey-Ferguson Services N.V., Curacao, Netherlands Antilles

[21] Appl. No.: 719,035

[22] Filed: Aug. 30, 1976

[30] Foreign Application Priority Data

Sep. 2, 1975 [GB] United Kingdom .............. 36359/75

[51] Int. Cl.² ............................................. B62D 55/10
[52] U.S. Cl. ........................................ 180/9.5; 305/16
[58] Field of Search ..................... 180/9.5, 9.46, 5 R, 180/9.2 R; 403/131; 305/116

[56] References Cited

U.S. PATENT DOCUMENTS 3,889,769  6/1975  Blomstrom .......................... 180/9.5

Primary Examiner—Philip Goodman
Attorney, Agent, or Firm—Thomas P. Lewandowski

[57] ABSTRACT

Support bearing to receive the ends of a crawler front traverse for fastening to the track roller frame, the bearing support comprising a pin with ball joint arranged in a completely sealed housing and forming a self-contained pre-fabricated unit which according to production requirements is fitted to the traverse or to the track frame prior to assembly. Joint allows axial movement to accommodate kinematics of support linkage.

3 Claims, 4 Drawing Figures

JOINTS

This invention relates to joints and in particular to joints for connecting a pair of relatively movable members.

Such an application is to be found on crawler vehicles where the vehicle traverses the ground by means of endless tracks which are driven by sprockets and supported on track frames. It is usual to allow the frames to oscillate about a transverse axis to accommodate undulations in the ground level. Further it is necessary to ensure that the tracks and the sprockets are aligned at all times to avoid the tracks coming off the sprockets and particularly to reduce wear of all track parts by proper alignment. The problem of alignment is aggravated by side loads such as occur when using the vehicle on hillsides and when turning. It is usual to support the forward portion of the crawler on the track frames by use of a transverse bar which is pivoted intermediate its ends to a forward portion of the chassis of the vehicle and at each end to one of the track frames. Such arrangements must allow for the conflicting requirements of allowing the vertical oscillation of the track frames and yet prevent sideways movement of the frames and the imposition of larger strains on the vehicle chassis due to the kinematics of the linkage.

It is desirable therefore that the connections between the bar and the frames should accommodate realignment of the various components to allow for the kinematics of the system whilst being able to resist side loads and maintain the sprockets and tracks in correct alignment.

Further the connections between the bar and the track frames operate in a hostile environment of dirt and mud and so must be preferably sealed yet should be easily assembled.

It is an object of the present invention to provide a joint suitable for such applications.

According to the present invention there is provided a joint comprising a shaft, a journal mounted on said shaft so as to be axially movable, and presenting a spherical outer surface to a complimentary race, which is adapted to be connected to at least one housing extending in an axial direction beyond said journal, a cavity being defined between said shaft and said housing and having sealing means located therein and abutting said housing and said shaft.

Preferably said sealing means includes a resilient sealing ring and an annular sealing disc, said resilient sealing ring being arranged so that it contacts the shaft and the housing as well as the annular sealing disc, the internal diameter of which provides a tight fit on said shaft and the external diameter of which is less than the internal diameter of said housing, said disc being arranged to be mounted on said shaft and to abut a radially extending face on the internal surface of said housing.

According also to the present invention there is provided a crawler vehicle comprising a chassis, a sprocket mounted on said chassis and adapted to drive an endless track, said track being supported by a frame pivoted to said chassis adjacent said sprocket and connected at a spaced location to a transversly extending beam which is pivoted intermediate its ends to said chassis for pivotal movement about a longitudinal axis, said connection between said beam and said frame comprising a joint which permits relative movement in a longitudinal direction whilst inhibiting movement in a transverse direction.

An embodiment of the invention will now be described by way of example only with reference to the accompanying drawings in which.

Figure 1:
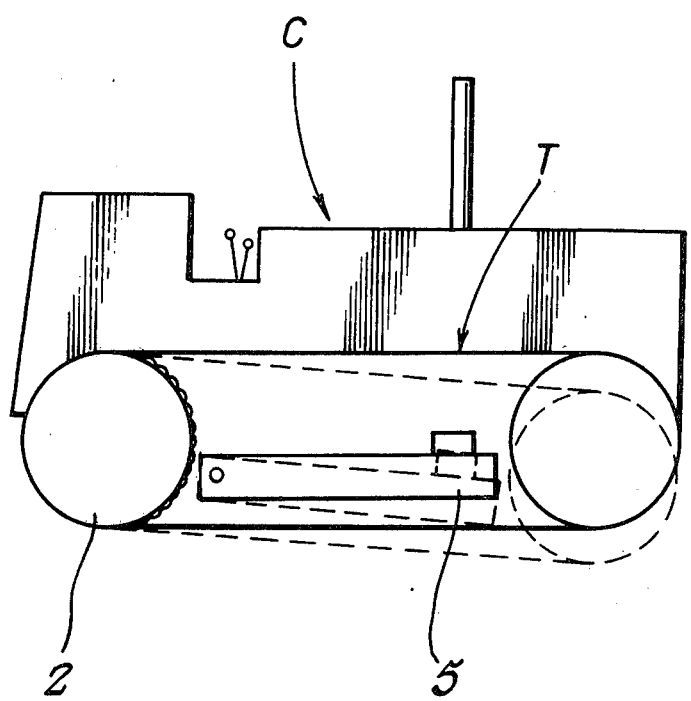
FIG. 1 is a side view of a crawler.

Referring now to FIG. 1, a crawler vehicle C is provided with endless tracks T which are driven by a sprocket 2 and supported by a track frame 5.

Figure 2:
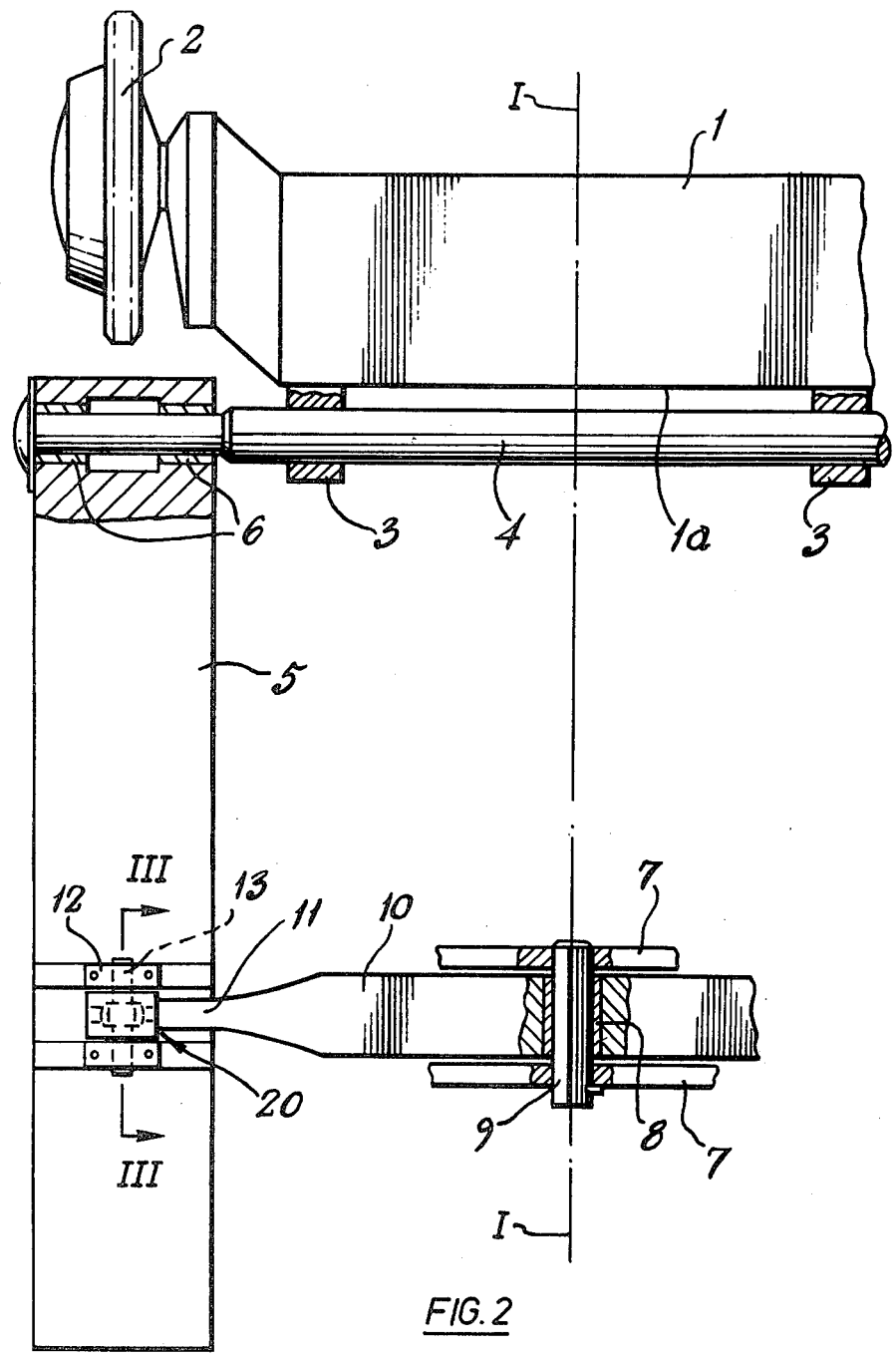
FIG. 2 is a plan view of the supporting structure and drive for the tracks of the vehicle of FIG. 1.

As can best be seen in FIG. 2, the track frame 5 is pivotally connected to a bar 4 by bearings 6, the bar 4 being supported in brackets 3 connected to the final drive housing 1 which forms part of the chassis of the vehicle. The final drive transmits power from the engine (not shown) to the drive sprocket 2.

A transversly extending crossbeam 10 is pivotally mounted between plates 7 on a forward portion of the chassis by means of a pin 9 supported in bearings 8.

The outer extremity 11 of the beam 10 is connected to the track frame 5 by a joint 20 interposed between the crossbeam 10 and a yoke 12 which is securely fastened to the frame 5. Various methods of fastening the yoke to the frame are possible. In the embodiment shown, the yoke 12 is formed in two parts with the joint line in the horizontal plane, the lower part being fastened to the track frame and both parts being fastened to one another by bolts 12a. This permits removal of the complete joint 20 or the shaft 13 by elevating the crossbeam 10 relative to the frame 5 and in the latter case by also disassembling part of the joint 20.

Figure 3:
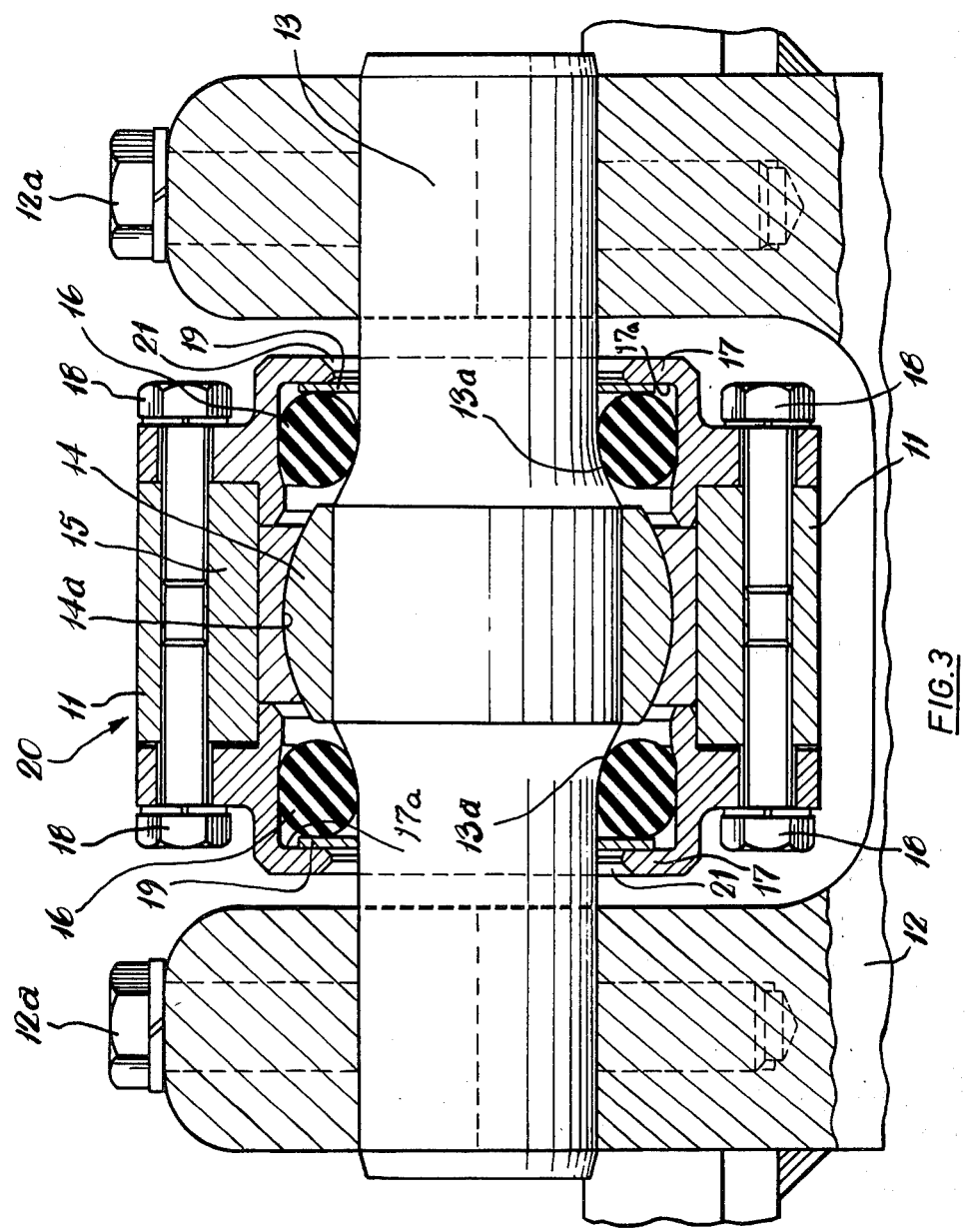
FIG. 3 is a view on the line III—III of FIG. 2 on an enlarged scale.
Figure 4:
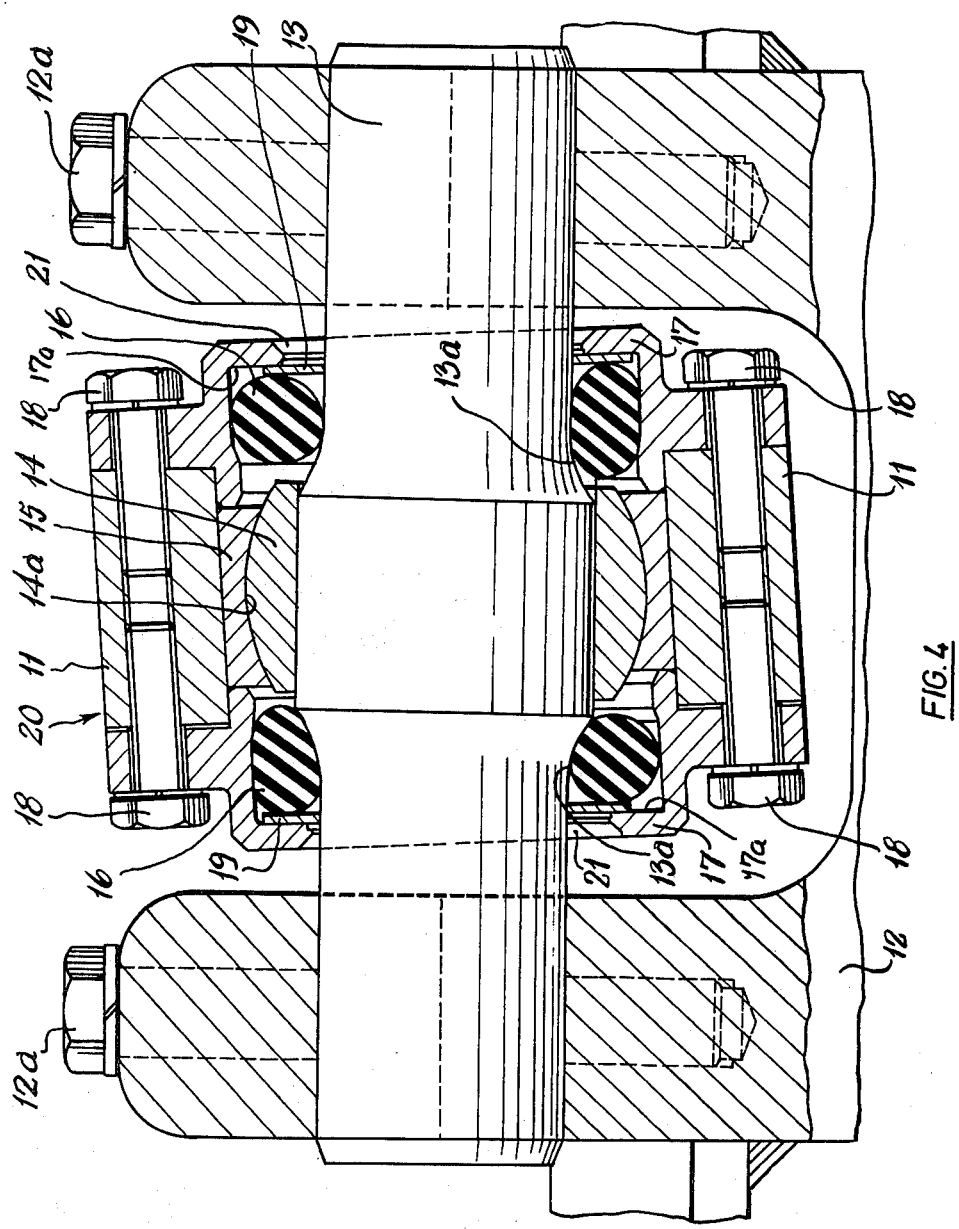
FIG. 4 is a view similar to FIG. 3 showing the components with the tracks in the position shown in (chain) dotted lines in FIG. 1.

The joint 20 may best be seen in FIGS. 3 and 4 and comprises a shaft 13 having a bearing portion 13a of increased diameter on which is mounted a journal 14. The journal 14 may slide axially on the shaft 13 and presents a spherical surface 14a to a complimentary race 15. The race 15 is held between a pair of housing 17 each of which is secured by bolts 18 to the extremity 11 of the crossbeam 10.

The housings 17 are provided with apertures 21 through which the shaft 13 passes, the diameter of the aperture 21 being considerably greater than that of the shaft 13.

A resilient sealing ring 16 is located in the cavity between the housing 17 and the shaft 13 and arranged so that it contacts both the shaft 13 and the housing 17 at all times.

A thin disc 19, the internal diameter of which is a tight fit on the shaft 13 is located between the sealing ring 16 and an inwardly facing end face 17a of the housing 17. The external diameter of the disc 19 is less than the internal diameter of the housing 17 but greater than the diameter of the aperture 21 so that the disc 19 may slide on the end face 17a during articulation of the joint 20. The disc 19 is forced against said end face 17a by the resilient sealing ring 16 at all times and under all operating conditions.

FIG. 4 shows the configuration of the joint 20 with a track in the position shown in dotted lines in FIG. 1, such as would occur if one of the tracks was to travel over a bump. It will be apparent that since the beam 10 moves in a plane whilst the yoke 12 will move in an arc the distance from the axis of the bar 4 to the intersection of the beam 10 and the frame 5 will vary as the frame 5 oscillates about the bar 4. The joint 20 accommodates this variation by the displacement of the shaft 13 relative to the journal 14. The joint 20 is able to withstand substantial side loads through the race 15 and journal 14 and by virtue of the sealing rings 16 and the discs 19 the joint 20 is sealed against ingress of dirt at all times. This ensures that the joint 20 continues to function satisfactorily under all operating conditions and so avoids placing great strain on the roller frame, crossbeam and chassis.

Further the joint may be readily assembled and disassembled to facilitate servicing of the vehicle. The joint may be preassembled as a self-contained unit and fitted to the extremities 11 of the beam 10 before the beam is connected to the frame 5.

What we claim is:

1. A crawler vehicle comprising a chassis, a sprocket mounted on said chassis and adapted to drive an endless track, said track being supported by a frame pivoted to said chassis adjacent said sprocket and connected at a spaced location to a transversly extending beam which is pivoted intermediate its ends to said chassis for pivotal movement about a longitudinal axis, said joint including a shaft connected to said frame, an axially movable journal on said shaft, said journal presenting a spherical outer surface to a complimentary race, a housing connected to said race extending in an axial direction beyond said journal, two pieces to said housing, fastening means by which said pieces are connected to each other and connected to said beam to form a cavity between said shaft and said housing, said pieces each having apertures therein for passage of said shaft therethrough which are larger than the periphery of said shaft, and sealing means located in said housing and abutting said shaft and said housing to close the apertures in said pieces to form a joint which permits relative movement in a longitudinal direction while inhibiting movement in a transverse direction.

2. A crawler vehicle comprising a chassis, a sprocket mounted on said chassis and adapted to drive an endless track, said track being supported by a frame pivoted to said chassis adjacent said sprocket and connected at a spaced location to a transversely extending beam which is pivoted intermediate its ends to said chassis for pivotal movement about a longitudinal axis, said joint including a shaft connected to said frame, an axially movable journal on said shaft, said journal presenting a spherical outer surface to a complimentary race, a housing connected to said race extending in an axial direction beyond said journal, and connected to said beam to form a cavity between said shaft and said housing and having sealing means located therein and abutting said shaft and said housing, said sealing means including a resilient sealing ring and an annular sealing disc, said resilient sealing ring being arranged so that it contacts the shaft, the housing and the annular sealing disc, the internal diameter of said disc providing a tight fit on said shaft and the external diameter of said disc being less than the internal diameter of said housing, said disc being arranged to be mounted on said shaft and to abut a radially extending face on the internal surface of said housing.

3. A crawler vehicle according to claim 2 wherein said housing is detachably secured to said beam and said shaft is detachably secured to said frame.

* * * * *